Patented May 17, 1949

2,470,184

UNITED STATES PATENT OFFICE 2,470,184

ARRANGEMENT FOR COOLING COMBUSTION CHAMBERS

Hans Pfenninger, Baden, Switzerland, assignor to Aktiengesellschaft Brown, Boveri & Cie., Baden, Switzerland Application December 16, 1942, Serial No. 469,247
In Switzerland July 12, 1941

Section 1, Public Law 690, August 8, 1946
Patent expires July 12, 1961

9 Claims. (Cl. 60—41)

It has been found that for the production of heating or driving gases at a moderate temperature, combination chambers are very suitable having two concentrical cylindrical walls, the inner one of which contains the combustion space and is made of high heat- resisting sheet metal whilst the outer one forms the pressure-resisting casing. Air is passed through the space between the inner and outer cylindrical walls to cool the inner wall, and the cooling air then mixes with the combustion gases to provide a large volume of heating or driving gases of moderate temperature.

Such combustion chambers are used particularly for gas turbines with constant pressure combustion and air cooling. In connection with these it has also been proposed to render the cooling of the inner combustion chamber wall particularly effective by dividing this wall into a number of conduits through which the cooling air flows at a high velocity whilst the air supply to the individual conduits has only a low velocity.

Tests made with gas turbine combustion chambers of this kind have shown that the fundamental principle on which their construction is based is correct, but the practical success of the same is often detrimentally affected by the fact that the quantity of heat which has to be removed from the various parts of the combustion chamber wall is not uniform throughout but can differ very considerably. Uniform cooling is therefore either inadequate at some points or it requires much too large an amount of compression work if effective cooling is to be assured throughout the entire length of the chamber.

It is to be noted that the combustion of for instance heavy oils in gas turbine combustion chambers is only complete and smokeless within a comparatively narrow mixing range and that it is impossible for instance by means of a greater excess of air to prevent high combustion temperatures being reached. On the contrary endeavours should be made to maintain the temperature at the beginning as high as possible so that combustion is rapidly initiated and, on account of the high heat exchange which such combustion chambers have to stand, the combustion should be practically completed in as short a time as possible. Lining the initial zone of the combustion chamber with firebricks has not proved a success. Water-cooling is undesirable so that air is the only medium that can be used for cooling the wall of the combustion chamber.

The present invention concerns an arrangement for cooling combustion chambers with co-axial annular spaces for the flow of cooling air, particularly for gas turbines and the like, so that the different cooling requirements at different places along the combustion chamber wall can be met without increasing to an excessive value the power required for the compression of the cooling air. The method consists in supplying an annular space which surrounds that part of the inner combustion chamber wall nearest to the burner with cooling air at a higher pressure than the cooling air for the remaining parts of the inner wall of the combustion chamber. For instance this part of the cooling air can, due to the higher pressure, be given a particularly high flow velocity whereby a higher cooling effect is achieved. It has been found that even with strongly radiating fuels, the amount of heat which has to be conducted away in order to maintain a temperature which will assure a sufficiently long life for the metal wall of the combustion chamber is adequate when the product of the density and velocity of the cooling air attains the value of approximately 100. Since the amount of air required is only small the work of compression remains low, for instance for 1000 kilowatts turbine power it only amounts to about 5 kilowatts or ½%. If on the other hand the whole quantity of cooling air were compressed to the same extent the required power would amount to 30 kilowatts or 3% of the useful power. The part of the combustion chamber which is cooled with air compressed to the higher pressure is generally only a short portion of the wall of the combustion chamber nearest to the burner. This cooling air is also preferably mixed with the combustion gases, but not before all the fuel is ignited and at least partially burnt. With the arrangement according to the invention the length of this part amounts to at least 0.7 times the diameter of the combustion chamber.

The objects and advantages of the invention will be apparent from the following specification when taken with the accompanying drawing in which.

Figure 1:
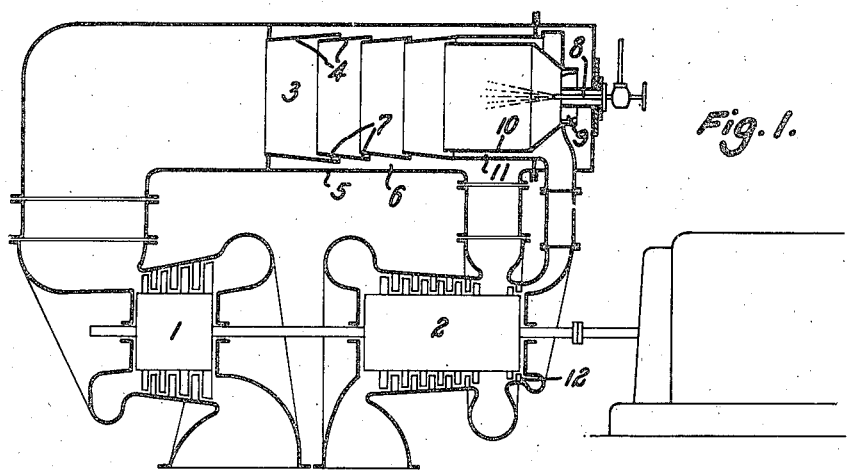
Fig. 1 is a schematic view, in substantially central section, of a combustion turbine plant embodying the invention, the air compressor being of the multistage type with outlets at different pressure levels.

In the drawings, the reference numeral 1 designates a gas turbine, 2 a compressor, 3 the combustion chamber. The combustion chamber consists of the outer pressure-proof casing 5 and the inner wall which is subdivided into a number of rings 4 of which some are cone-shaped.

These rings 4 are made of heat-resisting sheet metal such as chrome-nickel alloys, or chrome-nickel-molybdenum alloys, and the like. Cooling air flows along the annular space 6 between the rings 4 and the casing 5, and through the narrow annular passages 7 between adjacent rings 4 to the interior of the combustion chamber where it mixes with the combustion gases. The burner 8 is supported by blades 9 in the annular passage through which the combustion air enters the combustion chamber, the blades 9 being curved to impart a swirling motion to the entering column of primary combustion air. The burner assembly includes a shell 10 which is spaced from the adjacent inner wall ring 4 by an annular passage 11, the shell terminating short of the first of the plurality of annular passages 7 through which cooling air enters the combustion chamber from the outer annular cooling space 6. The axial length of the shell 10 is such, however, that all of the fuel is ignited and at least partially burned before it leaves the shell. The most highly heated portion of the combustion chamber is therefore the shell 10 and, in accordance with the invention, it is intensively cooled by a high velocity stream of air through the annular passage 11, this air for intense cooling being brought to a higher pressure than that delivered to the outer cooling passage 6 and to the combustion chamber around the burner 8 by the compressor 2. The pressure differential is established by one or more compressor stages 12 of the compressor 2, the pressure at the inlet to the stage or stages 12 being that of the air supplied to the outer cooling passage and to the burner.

Figure 2:
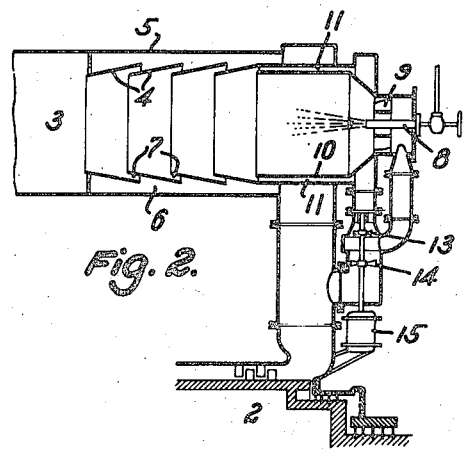
Fig. 2 is a fragmentary schematic sectional view of another embodiment in which the desired pressure differential is obtained by a separate blower following the main compressor.

With the plant shown in Fig. 2 the pressure of the cooling air is increased by means of a special blower 13 in a passage extending from the main cooling air conduit to the entrance to the cooling passage 11. This blower can also for instance form the second stage of the special blower, the first stage 14 of which serves to increase the pressure of the combustion air so as to overcome the resistance of the swirling blades 9 or to adjust the distribution of the combustion and cooling air. 15 is the driving motor for the blower.

Figure 3:
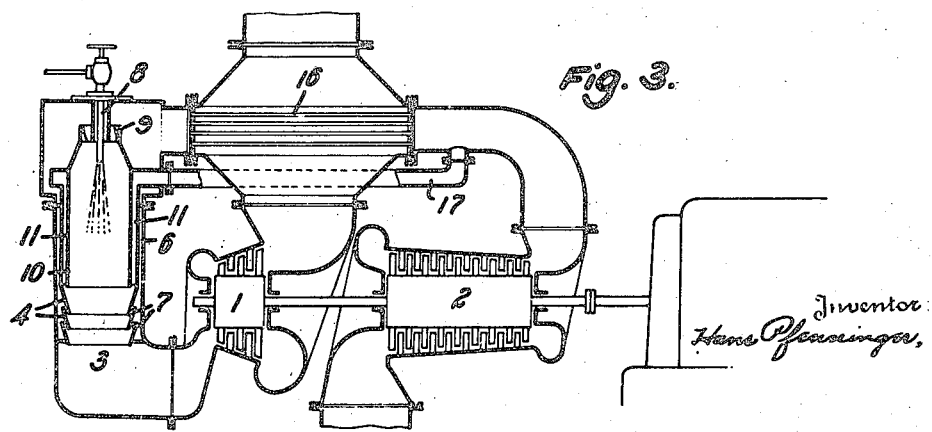
Fig. 3 is a schematic sectional view of a further embodiment in which the pressure differential is established by by-passing an air stream around a device that lowers the pressure of the main body of cooling air.

The pressure difference for a part of the cooling air can also be obtained by by-passing the preheater through which the rest of the cooling air flows. In the plant illustrated in Fig. 3, the turbine exhaust gases flow through a preheater 16. Whilst the combustion air and the larger part of the cooling air flows through the tubes of the preheater, the special cooling air passes direct to the combustion chamber through the pipe 17. The available pressure in the annular passage 11 is thus higher by an amount equal to the drop in pressure of the remaining cooling air flowing through the preheater. At the same time its cooling effect is better because it is not preheated.

I claim:

1. In a combustion turbine plant including an air compressor driven by a turbine to supply compressed air to a combustion chamber that develops a pressure gas for driving the turbine; a combustion chamber comprising an outer pressure-resisting casing, a heat resistant wall within and spaced radially from the casing, said wall comprising a plurality of rings with annular passages between adjacent rings a burner assembly including a fuel nozzle within a shell spaced from said wall by an annular passage, said shell terminating short of the annular passage of the heat resistant wall which is the closest to the fuel nozzle, means for introducing cooling air under pressure around the fuel nozzle and to the entrance to the space between said wall and said casing, and means for introducing cooling air at the entrance to said annular passage between said wall and said burner assembly shell under a higher pressure than that of the air supplied to the fuel nozzle and to the entrance to the space between said wall and said casing.

2. In a combustion turbine plant, the combination with a combustion gas turbine driving an air compressor, a combustion chamber for generating a pressure gas for delivery to the turbine; said combustion chamber including a fuel nozzle extending into a shell and means for introducing primary combustion air into the shell and about the nozzle, and a heat resistant wall and an outer pressure-resistant casing coaxial with said shell and spaced radially from each other and from said shell; of individual passages from the compressor to the annular spaces between said wall and, respectively, said shell and said casing; and means for delivering cooling air from said compressor to the annular space between said shell and wall at a higher pressure than that of the air delivered from said compressor to said shell for primary combustion and to the annular space between said wall and said casing for cooling.

3. In a combustion turbine plant, the invention as recited in claim 2, wherein said last mentioned means comprises means for compressing a portion of the compressed air output of said compressor to a higher pressure for delivery to the annular space between said shell and wall.

4. In a combustion turbine plant, the invention as recited in claim 2 wherein said compressor is a multistage compressor having outlets at different pressure levels, and said last-mentioned means comprises a connection of a lower pressure level outlet of the compressor to the passage that extends to the annular space between the wall and the casing, and a connection from a higher pressure outlet to the passage that extends to the annular space between the shell and the wall.

5. In a combustion gas turbine, the invention as recited in claim 2, in combination with means for introducing primary combustion air into said shell at a pressure greater than that of the air delivered to the annular space between said wall and said casing.

6. In a combustion gas turbine, the invention as recited in claim 2, wherein one of said passages is a conduit connecting the compressor outlet to the annular space between said wall and said casing, the other passage extending from said first passage to the annular space between said shell and wall; and said last mentioned means comprises a blower in said other passage.

7. In a combustion gas turbine, the invention as recited in claim 2, wherein one of said passages is a conduit connecting the compressor outlet to the annular space between said wall and said casing, the other passage extending from said first passage to the annular space between said shell and wall; and said last mentioned means comprises a blower in said other passage; in combination with a blower for supplying primary combustion air to said shell from said other passage.

8. In a combustion gas turbine, the invention as recited in claim 2, wherein said passage from the compressor to the annular space between said wall and said shell is substantially unobstructed, and said last mentioned means comprises pressure-reducing means in the other passage.

9. In a combustion gas turbine, the invention as recited in claim 2, wherein said passage from the compressor to the annular space between said wall and said shell is substantially unobstructed, and said last mentioned means comprises a heat exchanger in which compressed air flowing through the other passage is in heat-exchange relation to exhaust gases from the turbine.

HANS PFENNINGER.

REFERENCES CITED

The following references are of record in the file of this patent:

UNITED STATES PATENTS

| Number | Name | Date |
| --- | --- | --- |
| 611,813 | Marconnet | Oct. 4, 1898 |
| 1,375,601 | Morize | Apr. 19, 1921 |
| 2,011,420 | Samuelson | Aug. 13, 1935 |
| 2,107,365 | Bray | Feb. 8, 1938 |
| 2,110,209 | Engels | Mar. 8, 1938 |
| 2,131,781 | Lysholm | Oct. 4, 1938 |
| 2,268,464 | Seippel | Dec. 30, 1941 |

FOREIGN PATENTS

| Number | Country | Date |
| --- | --- | --- |
| 484,289 | Great Britain | May 3, 1938 |
| 539,069 | Great Britain | Aug. 27, 1941 |